June 3, 1969  J. HUBER  3,447,773
ELECTROMAGNETIC FLUID VALVE HAVING FLUID-TIGHT HOUSING
FOR ELECTROMAGNETIC PARTS
Filed April 28, 1966

INVENTOR.
JAKOB HUBER
BY
*Dicke + Craig*
ATTORNEYS

United States Patent Office 3,447,773
Patented June 3, 1969

3,447,773
ELECTROMAGNETIC FLUID VALVE HAVING
FLUID-TIGHT HOUSING FOR ELECTRO-
MAGNETIC PARTS
Jakob Huber, Wurenlos, Switzerland, assignor to J. Huber
& Cie, AG, Wurenlos, Switzerland
Filed Apr. 28, 1966, Ser. No. 545,939
Claims priority, application Switzerland, May 3, 1965,
6,171/65
Int. Cl. F16k 1/42, 31/04
U.S. Cl. 251—30                                       5 Claims

ABSTRACT OF THE DISCLOSURE

An electromagnetically operated fluid valve assembly comprising a plate-shaped magnetically permeable armature member for actuating the fluid valve assembly and acted on by a magnetic coil. The magnetic coil is enclosed in a stationary central core member and an outer cup-shaped magnetically conductive casing having one open end and that forms an outer sleeve core member encloses the magnetic coil. The outer casing is cast in a plastic housing which encloses the casing substantially and includes an extended housing portion of plastic material. The extended housing portion extends beyond and completely seals off the magnetic coil against the fluid chamber of the valve assembly. The plate-shaped armature is equipped with means for achieving a valving action and is movably disposed below the extended housing portion and subjected to a spring action for purposes of closure of the valve. The ends of the central core member and the open end of the outer sleeve core member are extended through the extended plastic housing portion within close proximity to the armature member to minimize magnetic losses.

This invention relates to an improved electromagnetic fluid valve assembly.

More specifically, the invention relates to a new and improved fluid valve assembly having a fluid tight housing for the electrical parts of the valve, and which is so designed that dirt particles, etc. cannot interfere with the operation of the valve.

With electromagnetically operated fluid valves, the magnetic force which acts upon a magnetically movable armature is that force which determines the strength with which the movable valving member or disk is operated. For increasing this force, the armature should be arranged as clos as possible to the electromagnetic coil so that use can be made of a so-called immersion armature wherein the armature itself performs the valving operation. This holds true also when a servo-control-type of valving is used wherein the armature of the electro-magnet controls the valve indirectly. In this case, the valving member or disk is most often an integral part of an elastic membrane or diaphragm which, while the valve is in a closed position, is pressed against the exit opening of the valve assembly by the fluid (liquid or gas) supply pressure. A small opening is provided in the center of the elastic membrane which connects the flow space with a space behind the diaphragm. This space itself, when the small opening is closed, is filled with liquid under pressure from the supply side with which it is in communication by means of a small channel. The electro-magnet armature serves, in this case, to close or open the small opening. Upon the armature being actuated to open the small opening, the space behind the diaphragm may be emptied through the drain opening, whereby the back pressure on the diaphragm disappears so that it can be lifted off the valve seat by the supply pressure.

The great danger of proper operation of such immersion armature valves results from dirt particles in the fluid medium which soil the armature and eventually interfere with its operation so that the valve assembly no longer operates reliably. Additionally, because the electromagnetic coil is arranged close to the armature, it is often exposed to the fluid medium being valved. If the medium is caustic in nature, etc., it can have a harmful effect on the electromagnetic coil as by shorting turns of the coil, etc., thereby deleteriously affecting operation of the valve assembly by reducing the force of the electromagnet.

The invention concerns itself with the above-mentioned problems and relates therefore to a new and improved fluid valve assembly for operation by means of an armature of an electro-magnet in which the electromagnetic coil is surrounded by a cylindrical magnetically conductive sleeve. The assembly is further characterized in that the electromagnetic coil and sleeve are supported (or cast) in a housing of pressed, non-magnetic material in such a way that the housing surrounds the coil and sleeve essentially entirely with a disk-shaped housing portion that seals the electromagnetic coil entirely against the fluid space. Openings are provided in the disk-shaped housing portion so that essentially the ends of a stationary core and of the sleeve project through the disk-shaped housing portion. A disk-shaped armature may then be movably arranged in the fluid outside the housing but in close proximity to the projecting ends of the core and sleeve.

This solution, on the one hand, makes it possible that the electrical portion of the valve is entirely separated from the fluid so as not to be subjected to attack thereby. On the other hand, sufficient free space around the armature is provided so that its movability is not disturbed by dirt. At the point where core and sleeve project through the pressed, non-magnetic material of the housing, cutouts are provided in the sleeve through which parts of the disk-shaped housing portion are solidly connected with other parts of the disk-shaped housing portion. The size of the cutouts are, on the one hand, determined by the strength of the pressed material out of which the housing is fabricated, and, on the other, by the requirement that the magnetic flux through the sleeve is not weakened too much. With this solution, the disk-shaped armature can be made inexpensive and does not have to be held to close tolerences but requires, however, certain guidance for which there is sufficient space available.

The enclosed figures illustrate a preferred embodiment of the invention.

FIGURES 2 and 3 show two possibilities for the construction of the cutouts in the magnetically conductive cylindrical sleeve whereas

Figure 1:
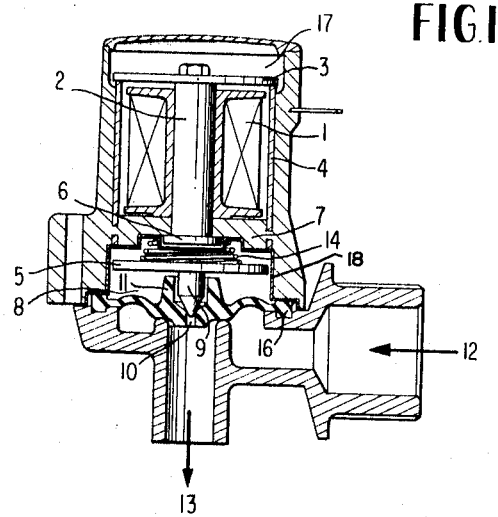
FIGURE 1 shows a cross section through a fluid valve assembly constructed in accordance with the invention wherein a servo-control-type of valving is employed.

FIGURE 1 illustrates a new and improved electromagnetic valve assembly constructed in accordance with the present invention, wherein the electric portion of the valve assembly comprised by a selectively operable removale electromagnetic coil 1, is disposed in the upper part of the assembly and surrounds a removable stationary central core member 2 formed from magnetically permeable material. The magnetic flux produced by electromagnetic coil 1 flows through a removable disk-shaped yoke plate 3 also formed from magnetically permeable material and considered to be a part of core member 2. The magnetic flux path is completed by a cylindrical sleeve core member 4 of magnetically permeable material which forms in conjunction with yoke plate 3 a cup-shaped outer magnetic casing. A magnetically permeable movable armature member 5 completes the flux path back to the core member 2 which is provided at its lower end with an enlargement 6.

Figure 2:
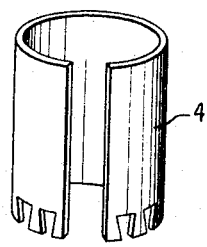
Figure 4:
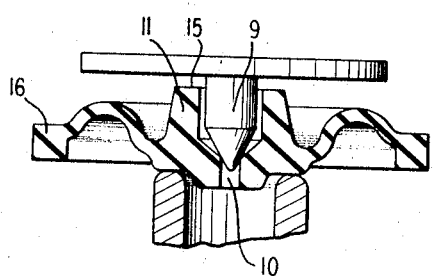
FIGURE 4 shows a cross section through the valve membrane in an enlarged scale.
Figure 3:
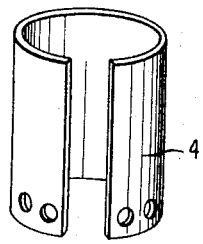

The magnetic portion of the valve assembly described above is supported within an upper or second housing portion comprised by an outer housing member of non-magnetic pressed or molded material having an integral, extended disk-shaped lower portion 7 through which the lower parts of core 2 and sleeve 4 protrude. The openings in the disk-shaped lower portion 7 of the outer housing through which the core 2 and sleeve 4 project are sealed entirely closed so to seal off the electrical portion of the valve assembly from the lower portion thereof which is exposed to the fluid medium being valved. Core 2 and sleeve 4 protrude through portion 7 into a space 8 fomed in the outer housing member and in which the movable armature 5 is arranged. Sleeve 4 has at the point of penetration through the disk-shaped lower portion 7, the above-mentioned cutouts, for example, trapezoidal slots or holes which are illustrated in FIGURES 2 and 3. Integral parts of the portion 7 extend through these cutouts so as to firmly lock the valve assembly in assembled relation.

Space 8 also contains a resilient membrane member 11 (also referred to as a valve disk) which is acted on by the movable armature 5. By energizing the coil 1, the armature 5 is moved against the enlarged portion 6 of the core 2 whereby a needle valve point 9 provided on the armature 5 is withdrawn from a small opening 10 in the center of the resilient membrane member or valve disk 11. The valve disk 11 is disposed over a lower or first housing portion having inlet and outlet openings 12 and 13, respectively. Upon the small opening 10 in disk valve 11 having the needle valve point 9 removed therefrom, the portion of space 8 in which armature 5 is arranged, is drained through small opening 10. As a result, the valve disk 11 under the influence of the pressure of the supply side 12 is lifted off and thereby clears the flow to the exit opening 13.

The armature 5 is further acted on and guided in its movement by a cone-shaped spiral spring means 14 which coacts with the magnetic flux acting on armature 5 to open and close the valve assembly. Guidance of the needle valve point 9 is considerably improved by the provision of a cap-shaped bulge 15 on the opening 10 of the valve disk 11 on the side thereof acted on by the point 9. By reason of this construction, the valve may be arranged at an angle or horizontal without impairing the movability through calcification as is the case with immersed armature valves.

When the electromagnetic coil 1 is de-energized, the spring 14 presses the needle valve point 9 of armature 5 against the opening 10. By this means, the space 8 can again be filled in a known manner through a small channel in the valve disk 11 (not shown) so that the valve disk 11 is pressed against its seat and the valve is closed.

If desired, a cap or liner 18 may be disposed in the space 8 and fitted over the ends of core 2 and sleeve 4.

The inventive feature of separating the electric portion from the fluid portion has also manufacturing advantages, particularly where the upper electric housing portion is separated from the lower housing portion through the medium of a fitted surface with seal 16. By such an arrangement, the electric portion can be manufactured separately whereby the coil with its supply of electric wires may be installed and closed off through the application of lacquer at the upper open space 17. Then, the individually assembled upper housing portion together with armature 5 and valve disk 11 is attached (screwed on) to the lower housing portion. For inspection and maintenance purposes, the upper electric portion may be removed while the lower housing portion with its supply inlet opening 12 and outlet opening 13 connected to fixed lines or pipes may remain in place.

I claim:
1. An electromagnetically operated fluid valve assembly comprising a cast outer housing formed from an insulating non-magnetic material, an outer cup-shaped magnetically conductive casing comprising a cylindrically-shaped outer sleeve core member having at one end thereof a removable magnetically conductive end portion forming a closed magnetic circuit between the outer sleeve core member and a removable central core member, a removable magnetic coil supported within the outer sleeve core member and surrounding the inner core member, a magnetically permeable disc armature member supported within the housing for actuating the fluid valve assembly and acted on by the magnetic flux produced by the magnetic coil, the outer sleeve core member of said outer casing being integrally cast in said outer insulating housing to form a unitary structure having an extended disc-shaped insulating housing portion separating and completely sealing off the magnetic coil from the fluid chamber of the valve assembly, the disc armature being equipped with means for achieving a valving action and being movably disposed below the extended housing portion and subjected to a spring action for purposes of closure of the valve, the ends of the stationary central core member and the open end of the outer sleeve core member being extended through the extended insulating housing portion within close proximity to the disc armature member to minimize magnetic losses.

2. The fluid valve assembly set forth in claim 1 further characterized by a liner disposed in the cavity and secured over the ends of the extension of the outer sleeve core member and the central core member.

3. The fluid valve assembly set forth in claim 1, further characterized by a resilient membrane member disposed in said chamber and acted on by said movable armature member for opening and closing the access between the inlet and outlet openings, the movable armature member being provided with a needle valve point and said resilient membrane member being provided with a cylindrical cup-shaped portion that coacts with and guides the needle valve point of the movable armature member during opening and closing of the valve assembly.

4. The fluid valve assembly set forth in claim 1, wherein the sleeve member has a plurality of cut-out portions for engaging the outer housing member and interlocking the two members together.

5. The fluid valve assembly set forth in claim 1, wherein the outer housing member, the sleeve member, the electromagnetic coil and the central core member are all cylindrically shaped and the main body of said movable armature member is disk-shaped.

References Cited
UNITED STATES PATENTS

| 3,269,689 | 8/1966 | Lee | 251—129 |
| 2,588,137 | 3/1952 | Marvin | 251—141 |
| 2,951,503 | 9/1960 | Windsor | 251—141 |
| 3,082,359 | 3/1963 | Mangiafico et al. | 335—260 X |
| 3,331,042 | 7/1967 | Erickson et al. | 251—129 X |

FOREIGN PATENTS

| 922,034 | 3/1963 | Great Britain. |
| 1,178,779 | 12/1958 | France. |

ARNOLD ROSENTHAL, *Primary Examiner.*

U.S. Cl. X.R.

251—129, 141; 335—260